United States Patent
Ewig et al.

(10) Patent No.: US 7,288,750 B2
(45) Date of Patent: Oct. 30, 2007

(54) LIGHT SIGNALING DEVICE

(75) Inventors: Pascal Ewig, Paris (FR); Jerome Valire, Rosny Sous Bois (FR)

(73) Assignee: ECE, Paris (FR)

( * ) Notice: Subject to any disclaimer, the term of this patent is extended or adjusted under 35 U.S.C. 154(b) by 0 days.

(21) Appl. No.: 11/327,158

(22) Filed: Jan. 6, 2006

(65) Prior Publication Data

US 2006/0249663 A1 Nov. 9, 2006

(30) Foreign Application Priority Data

Jan. 6, 2005 (FR) .................................. 05 00115

(51) Int. Cl.
*G01J 1/32* (2006.01)
(52) U.S. Cl. ................. 250/205; 250/214 AG
(58) Field of Classification Search ............ 250/214 C, 250/214 AG, 205
See application file for complete search history.

(56) References Cited

U.S. PATENT DOCUMENTS

| | | | | |
|---|---|---|---|---|
| 3,867,628 A | * | 2/1975 | Brown | ................... 250/214 B |
| 4,163,226 A | * | 7/1979 | Ogawa | ....................... 340/629 |
| 6,380,865 B1 | * | 4/2002 | Pederson | ............... 340/815.45 |
| 6,495,964 B1 | | 12/2002 | Muthu et al. | |
| 6,559,777 B1 | * | 5/2003 | Martin et al. | ............... 340/981 |
| 6,707,435 B1 | * | 3/2004 | Merlato et al. | ............... 345/39 |
| 7,135,664 B2 | * | 11/2006 | Vornsand et al. | .......... 250/205 |
| 2005/0093718 A1 | * | 5/2005 | Martin | ....................... 340/981 |
| 2005/0122727 A1 | * | 6/2005 | Machi et al. | ............... 362/470 |
| 2006/0006821 A1 | * | 1/2006 | Singer et al. | ............... 315/312 |

FOREIGN PATENT DOCUMENTS

EP 1156271 11/2001
WO 98/54030 12/1998

OTHER PUBLICATIONS

French Search Report For French Application No. 0500115, 1 page.

* cited by examiner

*Primary Examiner*—John R. Lee
(74) *Attorney, Agent, or Firm*—Meyertons, Hood, Kivlin, Kowert & Goetzel, P.C.; Eric B. Meyertons

(57) ABSTRACT

Light signalling device, in particular intended to be mounted on board an aircraft, includes a plurality of light elements mounted on a support and surrounded by a translucent cover, said device including a means of reflecting the light emitted by the light elements disposed near to the light elements, at least one photometric sensor positioned between the support and the reflection means, and a means of comparing a light intensity detected by the photometric sensor with a reference light intensity.

11 Claims, 3 Drawing Sheets

LIGHT SIGNALING DEVICE

PRIORITY CLAIM

This application claims priority to French Patent Application No. 05/00115 to Ewig et al., filed on Jan. 6, 2005.

BACKGROUND OF THE INVENTION

1. Field of the Invention

The present invention relates to a light-signaling device and, in particular, a signaling device intended to be mounted on an aircraft. The present invention relates more particularly to a light-signaling device comprising a plurality of light elements mounted on a support and surrounded by a cover that is translucent or transparent to the light.

2. Description of the Relevant Art

Document FR-A-2 339 922 discloses a light signaling device comprising an array of light-emitting diodes placed on a support and a translucent cover covering said diodes. The cover can be provided with reliefs associated with each of the diodes, so as to deflect the light rays from each of them and, in general, to format the radiation emitted jointly by the diodes.

The use of light-emitting diodes to generate the light radiation is advantageous, inasmuch as these diodes offer a lifespan very much greater than that of incandescent lamps. However, in use and at constant current, a drop in the average light intensity of the diodes is observed.

The signaling devices provided with such diodes do, however, present major drawbacks, associated with the fact that certain regulations, and in particular the Federal Aviation Regulations (FAR), impose particular requirements concerning the characteristics of the light beam emitted, in particular in terms of intensity.

Consequently, such signaling devices can be inappropriate to form signaling devices mounted on board an aircraft, the light intensity of the emitted radiation possibly falling below the minima required by the regulations over time.

SUMMARY OF THE INVENTION

These drawbacks may be overcome by using a light-signaling device that is particularly economical and able to indicate any inadequacy in the emitted light intensity.

To this end, a light-signaling device, in particular intended to be mounted on board an aircraft, includes a plurality of light elements mounted on a support and surrounded by a translucent cover. According to one embodiment, the signaling device includes a means of reflecting the light emitted by the light elements disposed near to the light elements, at least one photometric sensor positioned between the support and the reflection means, and a means of comparing a light intensity detected by the photometric sensor with a reference light intensity.

Such a signaling device has the advantage of detecting the intensity of the radiation emitted by the light elements and of being able to compare said intensity with a reference light intensity in order to detect any reduction in the intensity of the radiation emitted, in particular to ensure compliance with the requirements imposed by certain regulations, when the device is intended to be installed on board an aircraft. It thus becomes possible to detect an operating anomaly in the light elements of the device so as to increase the safety of the occupants of the aircraft on which the device is mounted.

Advantageously, the light elements include light-emitting diodes. Said diodes have a relatively long life span and their use prevents the deterioration of all of the light elements when one lighting element stops working.

In an embodiment, the reflection means is formed by the translucent cover.

Such a light signaling device presents the advantage of being particularly economical, compact and easy to mount. In practice, there is no need to provide a special element for reflecting the light emitted by the light elements so as to be able to detect any anomaly, such an element involving extra cost and mounting difficulties.

In another embodiment, the reflection means is mounted between the translucent cover and the support.

The photometric sensor may be positioned on the support adjacent to the light elements. Such an arrangement further increases the compactness of the device. The photometric sensor may include a phototransistor or a photodiode.

In an embodiment, the comparison means is linked to a signal output of the photometric sensor, the comparison means including a filter, an amplifier and a comparator.

The device may also include information means concerning the changes to the light intensity of the light elements.

Also described herein is a method of monitoring a light-signaling device including a set of light-emitting diodes mounted on a support and covered by a translucent cover, in which:

the light emitted by the diodes is reflected, a reflected light signal is detected, and the light intensity of the diodes is compared with a reference light intensity.

Advantageously, the reflected light signal is filtered at the power supply frequency of the diodes in order to compare the light intensity of the diodes with the reference light intensity.

In an embodiment of the method, an alarm is triggered if the light intensity is less than the reference light intensity. It is also possible to trigger the alarm if the light intensity is less than the reference light intensity for a predetermined time.

In an embodiment, the light signaling device, in particular intended to be mounted on board an aircraft, includes a plurality of light elements mounted on a support and surrounded by a translucent cover, a means of reflecting the light emitted by the light elements disposed near to the light elements, at least one photometric sensor, and a means of comparing a light intensity detected by the photometric sensor with a reference light intensity. The photometric sensor is positioned on the support adjacent to the light elements, the reflection means for reflecting the light emitted in the direction of said photometric sensor also being used to transmit the rays emitted by the light elements towards the outside of the device.

In other words, the device includes a photometric sensor positioned on the support on the same side as that on which the light elements are mounted, and a single means for reflecting the light emitted in the direction of said photometric sensor and transmitting the rays emitted towards the outside of the device.

With the described light signaling device, it thus becomes possible to do away with a reflecting surface in addition to that of the reflection means facing the rear of the support, the main result of which is to provide for a device of relatively simple and economical design and presenting a small footprint.

BRIEF DESCRIPTION OF THE DRAWINGS

The present invention will be better understood from reading the detailed description of an embodiment taken as an example, by no means limiting, and illustrated by the appended drawings, in which.

Figure 1:
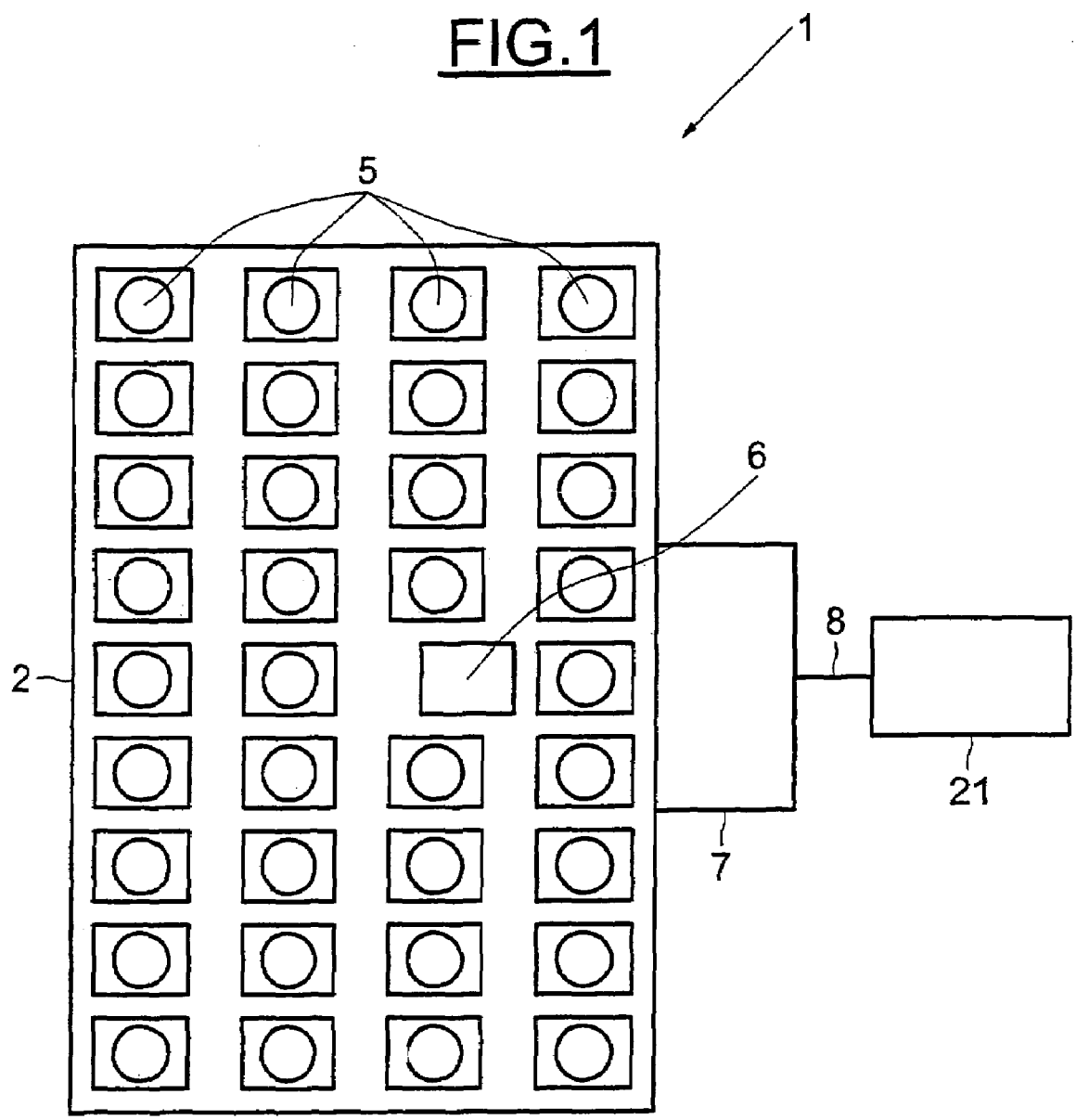
FIG. 1 is a schematic view of a signaling device according to the invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
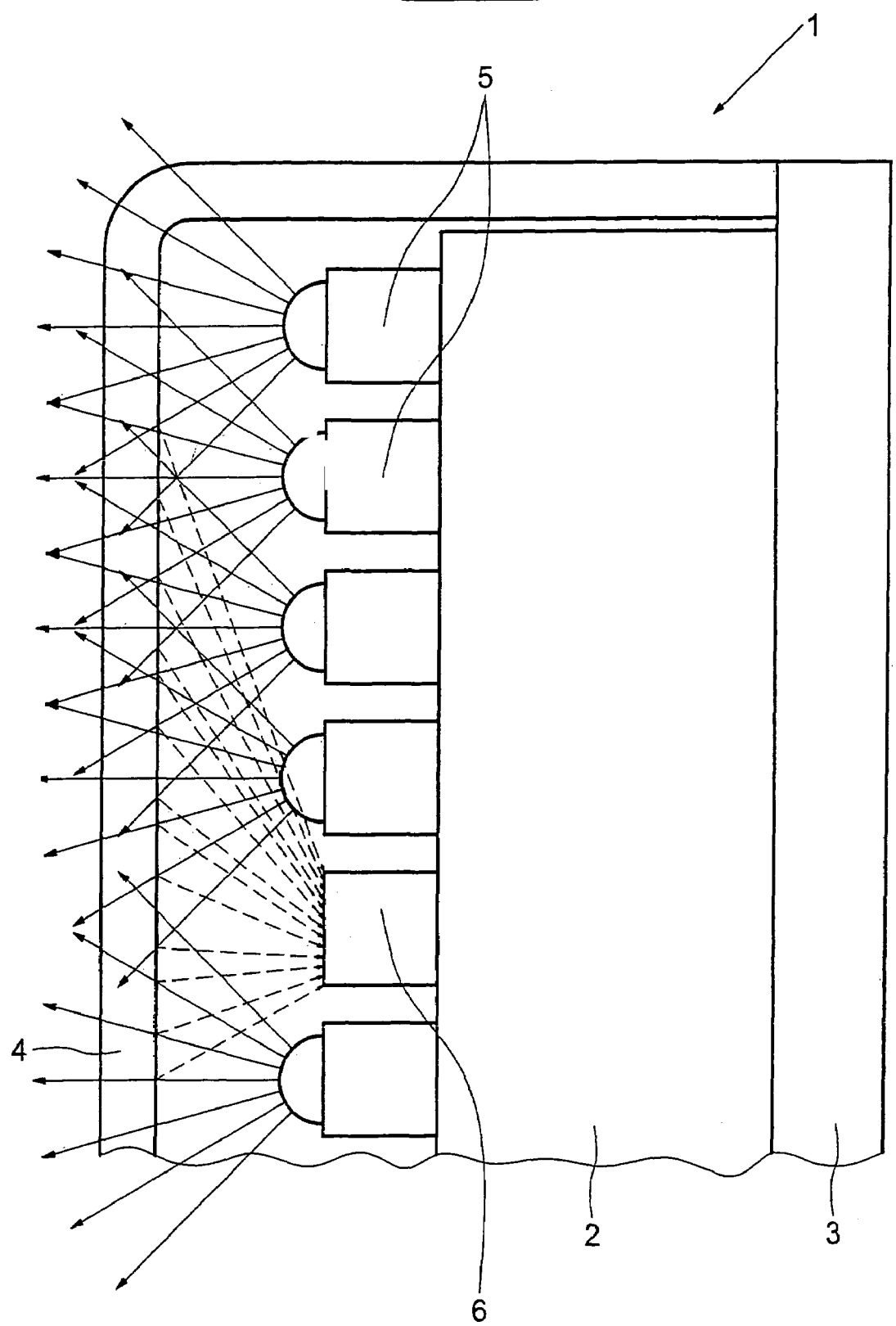
FIG. 2 is a side view of the signaling device of FIG. 1.

FIGS. 1 and 2 schematically represent a light-signaling device, referenced as 1 overall. In the application concerned, the device 1 is intended to be mounted on board an aircraft, for example a helicopter, and designed to emit light signals to signal the presence of the aircraft on which it is mounted and thus form a light signaling device that can be used for a navigation light type applications.

The device 1 in this case includes a support 2, forming a plate of generally rectangular shape, fixed on its rear to a base 3 which is in turn mounted on the aircraft. The device 1 also includes a rectangular cover 4, transparent or translucent to the light, fixed to the periphery of the base 3, and capping the support 2. The cover is advantageously made of a molded synthetic material, for example poly(methyl methacrylate) or polycarbonate.

The device 1 also includes a plurality of light elements 5 disposed on the front of the support 2, for example, light-emitting diodes, powered from a power source (not represented). For example, if "white" diodes are used, the diodes can present radial emission angles, respectively of 60 degrees and 20 degrees in the horizontal and vertical directions. With "green" diodes, the emission angles can be respectively 20 degrees and 30 degrees in the horizontal and vertical directions, and with "red" diodes, the emission angles can be 30 degrees in both horizontal and vertical directions.

The power source of the light elements 5 is associated with an appropriate electrical circuit to deliver to the light elements a power supply signal, for example in the form of pulses for modulating the emitted light intensity. As an illustration, a time-division modulation of the light intensity involving keeping the light elements on for 2 ms then off for 0.5 ms can be envisaged and used to obtain a light intensity that appears constant to an external observer.

The light elements 5 are arranged in a matrix of parallel rows, in this case comprising four vertical rows and nine horizontal rows. It is also possible to envisage a light signaling device 1, for example of generally rectangular shape, and formed by a support assembly 2, so as to obtain a light intensity radiation over a specific range, in particular to comply with the requirements imposed by certain regulations.

The device 1 also includes a photometric sensor 6 fixed on the support 2, adjacent to the light elements 5. In other words, the photometric sensor 6 is fixed on the front side of the support 2.

The photometric sensor 6 is, in this case, fixed in a vertical row between two light elements 5 and in a horizontal row between two light elements 5. The photometric sensor 6 is disposed on the support 2 roughly in a position dedicated to a light element 5. In other words, one of the parallel rows of light elements 5 has a smaller number of light elements 5 than the other parallel rows.

The photometric sensor 6 is in this case mounted roughly in the middle of the support 2 so as to receive a high reflected light density. The photometric sensor 6 may be a phototransistor or a photodiode.

In operation, the light radiations from the light elements 5 are emitted towards the outside of the device 1 by passing through the cover 4, to make the aircraft on which the device 1 is mounted more visible. A portion of the light rays is reflected by said cover 4 in the direction of the photometric sensor 6 to detect the light intensity emitted by the light elements 5, the sensor 6 being positioned on the support 2 so as to receive a high reflected light intensity corresponding approximately to five percent of the emitted radiation. It will be noted that it is also possible to envisage mounting a number of photometric sensors 6 on the support 2 to detect a large number of reflected rays in order to improve the accuracy of the measurement.

The cover 4 is used not only to transmit the light rays from the light elements 5, said cover 4 being positioned in the direction of emission of the elements, but may also be used to reflect a portion of these light rays so as to detect any anomaly in the device. Given these conditions, the cover 4 forms a single means of reflection. The portion of the reflection-means-forming cover 4 is mounted alongside the light elements 5, looking at the support 2. The cover 4 is therefore facing the light elements 5.

As a variant, it is also possible to envisage a reflection element dedicated to the light emitted by the light elements 5 mounted between the cover 4 and the support 2, so as to do away with the impurities that can be deposited on the cover 4, in particular in the case of a seal-tightness defect affecting the translucent protective housing (not shown) inside which the device 1 is mounted. In practice, such a deposit may cause the detection function to malfunction by generating, in particular, an increase in the reflection of the light rays from the light elements 5.

The measured value of the radiation detected by the photometric sensor 6 is transmitted to an output module 7 fixed on one side of the support 2 and linked to the photometric sensor 6. The output module 7 is designed to generate a signal representative of the quantity measured by the photometric sensor 6 and to transmit said signal, via a connection 8, to a signal processing block 21. Designing an output module 7 within which the block 21 is mounted may be envisaged.

Figure 3:
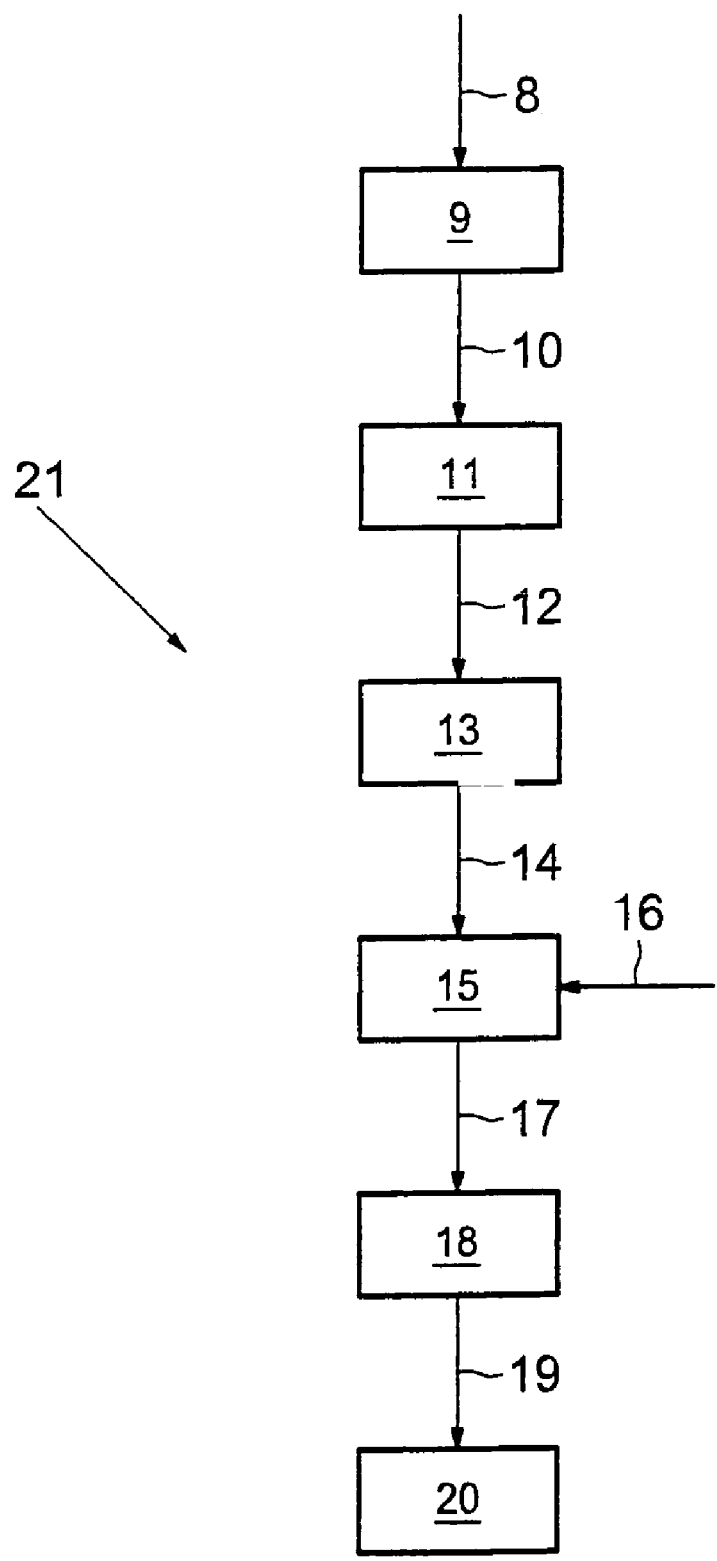
FIG. 3 is a schematic view of a unit for processing a signal emitted by an element of the device of FIG. 1.

As illustrated in FIG. 3, the processing block 21 includes a filtering element 9 receiving, via the connection 8, the value of the radiation detected by the photometric sensor 6 (FIG. 1). In practice, the light detected by the photometric sensor 6 includes components derived from the reflection on the cover 4 of the radiation emitted by the light elements 5, from the light of the sun, from light sources external to the device that may be mounted on the aircraft, and from light sources located on the ground.

The filtering element 9, such as a filter, is used to filter the light detected by the photometric sensor 6 to centered on the power supply frequency of the light elements 5 so as to eliminate the stray contributions originating from the light of the sun and from the light sources external to the device 1 that may be detected by the photometric sensor 6.

The filtered data representative of the light detected by the photometric sensor 6, originating mainly from the reflection on the cover 4 of the radiation emitted by the light elements 5, is transmitted via a connection 10 to a processing module 11 designed to amplify and smooth said data, before being transmitted via a connection 12 to an integrator 13.

The integrator 13 is used to obtain a voltage proportional to the light intensity of the radiation emitted by the light elements 5. Said voltage is transmitted via the connection 14 to a comparator 15 which also receives, via a connection 16, a reference voltage value $V_{ref}$ corresponding to a reference light intensity $I_{ref}$, which can be the minimum light intensity required by a regulation. The filtering means 9, the processing module 11, the integrator 13 and the comparator 15 thus form a means of comparing a light intensity of the light elements 5 with a reference light intensity.

A first step is then to determine whether the value of the voltage representative of the light intensity emitted by the light elements 5 is less than the reference voltage $V_{ref}$. If such is the case, a connection 17 transmits data representative of an alarm signal to a timer 18, transmitting said data via the connection 19 to a signaling means 20. When the time for which the voltage representative of the light intensity of the light elements 5 is less than the reference voltage $V_{ref}$ is greater than a predetermined time, for example five minutes, an alarm signal is activated. The signaling means can, for example, be a warning light installed in the cockpit of the aircraft on which the device 1 is mounted.

Of course, the timer 18 can be eliminated, so as to obtain an alarm signal immediately the light intensity of the light elements 5 falls below a reference intensity. However, such a timer 18 prevents the device 1 from signaling a malfunction of the light elements 5 that may be due to an isolated failure of said light elements 5.

It is also possible to envisage a temperature range of use for which the device 1 can be activated. In practice, when the photometric sensor 6 comprises a phototransistor, the signal detected can vary according to the ambient temperature, which can generate a slight malfunction in the detection of the signaling device 1. The use of a photodiode can overcome any problems of use at low or high temperatures. Similarly, it is also possible to envisage having the alarm inhibited in the event of strong sun glare. In practice, in the event of a so-called "low-angled" light from the sun, strong glare from the sun can cause the device 1 to become saturated.

The light-signaling device offers numerous advantages, including a detection of the light intensity emitted by the light elements to determine particularly easily any failure of said light elements.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A light signaling device, configured to be mounted on board an aircraft, comprising:
   a plurality of light elements mounted on a front side of a support and surrounded by a translucent cover;
   a means of reflecting the light emitted by the light elements disposed near to the light elements;
   at least one photometric sensor arranged on the front side of the support adjacent to the light elements; and
   a means of comparing a light intensity detected by the photometric sensor with a reference light intensity;
   wherein the reflection means for reflecting the light emitted in the direction of said photometric sensor is also used to transmit the rays emitted by the light elements towards the outside of the device.

2. The device according to claim 1, wherein the light elements comprise light-emitting diodes.

3. The device according to claim 1, wherein the reflection means is formed by the translucent cover.

4. The device according to claim 1, wherein the reflection means is mounted between the translucent cover and the support.

5. The device according to claim 1, wherein the photometric sensor comprises a phototransistor or a photodiode.

6. The device according to claim 1, wherein the comparison means is linked to a signal output of the photometric sensor, the comparison means comprising a filter, an amplifier and a comparator.

7. The device according to claim 1, further comprising information means concerning the changes to the light intensity of the light elements.

8. A method of monitoring a light signaling device, the light signaling device comprising a set of light-emitting diodes mounted on a front side of a support and covered by a translucent cover, the method comprising:
   reflecting the light emitted by the diodes;
   detecting the reflected light signal by a photometric sensor arranged on the front side of the support adjacent to the light elements; and
   comparing the light intensity of the diodes with a reference light intensity.

9. The method according to claim 8, wherein the reflected light signal is filtered at the power supply frequency of the diodes in order to compare the light intensity of the diodes with the reference light intensity.

10. The method according to claim 8, further comprising triggering an alarm if the light intensity is less than the reference light intensity.

11. The method according to claim 10, wherein the alarm is triggered if the light intensity is less than the reference light intensity for a predetermined time.

* * * * *